United States Patent
Lu

(10) Patent No.: US 9,167,833 B2
(45) Date of Patent: Oct. 27, 2015

(54) METHOD FOR REMOVING PROTEIN FROM A FOOD

(71) Applicant: Decken Biotech.,Inc., Taichung (TW)

(72) Inventor: Liang Ting Lu, Taichung (TW)

(73) Assignee: Decken Biotech., Inc., Taichung (TW)

( * ) Notice: Subject to any disclaimer, the term of this patent is extended or adjusted under 35 U.S.C. 154(b) by 0 days.

(21) Appl. No.: 13/935,365

(22) Filed: Jul. 3, 2013

(65) Prior Publication Data
US 2015/0010988 A1 Jan. 8, 2015

(51) Int. Cl.
*C07K 1/00* (2006.01)
*C12P 1/00* (2006.01)
*A23J 3/34* (2006.01)

(52) U.S. Cl.
CPC .......................................... *A23J 3/34* (2013.01)

(58) Field of Classification Search
CPC .................................... C07K 1/00; C12S 3/00
See application file for complete search history.

(56) References Cited

U.S. PATENT DOCUMENTS 5,039,532 A * 8/1991 Jost et al. ......................... 426/41

FOREIGN PATENT DOCUMENTS

EP 1236405 A1 * 4/2002 ................ A23J 3/34

* cited by examiner

*Primary Examiner* — Karen Cochrane Carlson
*Assistant Examiner* — Natalie Moss
(74) *Attorney, Agent, or Firm* — Tracy M. Helms; Apex Juris, pllc

(57) ABSTRACT

A method for removing protein from a food includes adding a first group of enzymes into a food while cooking the food. The first group of enzymes decomposes protein in the food in a first enzyme reaction. Let a mixture of the first group of enzymes and the food rest after cooling the mixture to a temperature below 45° C. Then, the mixture is boiled to terminate the first enzyme reaction. A second enzyme is added into the mixture after the boiled mixture is cooled to a temperature below 45° C., and let mixture of the first group of enzymes, the food, and the second enzyme rest. The second enzyme carries out a second-stage decomposition of protein in the food in a second enzyme reaction. Then, the mixture of the first group of enzymes, the food, and the second enzyme is boiled to terminate the second enzyme reaction.

8 Claims, 1 Drawing Sheet

First decomposition step
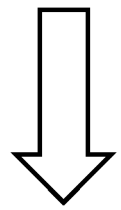
Second decomposition step

METHOD FOR REMOVING PROTEIN FROM A FOOD

BACKGROUND OF THE INVENTION

The present invention relates to a method for removing protein from a food and, more particularly, to a method for removing protein from a food by adding specific enzymes into the food and by controlling the temperature to remove protein in the food, preventing deterioration of the food and preventing offensive smell.

There are various nutritive foods produced from foodstuffs through extraction, particularly liquid foods, such as chicken essence, clam essence, etc. These liquid foods can be dried into reproduced nutritive foods in solid forms. The requirements for quality are higher while the need of nutritive foods increases due to increasing attention in the health among modern peoples.

However, some of the nutritive foods contain plenty of protein, nucleotide, or fat acid that are released during production of the nutritive foods regardless of liquid or solid forms of the products. Thus, gradual oxidation and deterioration of protein and even propagation of bacteria occur no matter how the nutritive foods are packaged. The nutritive foods are liable to have unpleasant smell and offensive smell or even deterioration due to excessive oxidation resulting from excessively long-term preservation or improper preservation conditions. In addition to uncomfortable smell to the users during eating, these nutritive foods may cause adverse affect to the health.

BRIEF SUMMARY OF THE INVENTION

A method for removing protein from a food according to the present invention includes a first decomposition step and a second decomposition step. In the first decomposition step, a first group of enzymes is added into a food while cooking the food. The first group of enzymes decomposes protein in the food in a first enzyme reaction. A mixture of the first group of enzymes and the food is cooled to a temperature below 45° C., and let the mixture of the first group of enzymes and the food rest. Then, the mixture of the first group of enzymes and the food is boiled to terminate the first enzyme reaction.

In the second decomposition step, the boiled mixture is cooled to a temperature below 45° C. A second enzyme is added into the mixture of the first group of enzymes and the food below 45° C., and let mixture of the first group of enzymes, the food, and the second enzyme below 45° C. rest. The second enzyme carries out a second-stage decomposition of protein in the food in a second enzyme reaction while resting the mixture of the first group of enzymes, the food, and the second enzyme. Then, the mixture of the first group of enzymes, the food, and the second enzyme is boiled to terminate the second enzyme reaction.

Preferably, the first group of enzymes is selected from the group consisting of nattokinase, bromelain, papain and combinations thereof.

Preferably, the first group of enzymes includes 0.01 wt % of nattokinase per unit weight of the food, 0.01 wt % of bromelain per unit weight of the food, and 0.02 wt % of papain per unit weight of the food.

Preferably, the nattokinase has an activity of 20,000 FU/g, the bromelain has an activity of 200 CDU/g, and the papain has an activity of 10,000 FU/g.

Preferably, the mixture of the first group of enzymes and the food is at rest for 120 minutes before boiling the mixture of the first group of enzymes and the food.

Preferably, 3 wt % of second enzyme is added per unit weight of the food.

Preferably, the mixture of the first group of enzymes, the food, and the second enzyme is at rest for 30 minutes before boiling the mixture of the first group of enzymes, the food, and the second enzyme.

Preferably, the second enzyme is pepsin having an activity of 1,000 AU/g.

The present invention will become clearer in light of the following detailed description of illustrative embodiments of this invention described in connection with the drawings.

DESCRIPTION OF THE DRAWING

The drawing shows a flowchart of a method for removing protein from a food according to the present invention.

DETAILED DESCRIPTION OF THE INVENTION

A method for removing protein from a food according to the present invention is illustrated in the drawing. In an example, the method is used to remove protein during production of clam essence from fresh clams. The method for removing protein from a food according to the present invention includes a first decomposition step S1 and a second decomposition step S2.

In the first decomposition step S1, a first group of enzymes is added into a food while cooking the food. The first group of enzymes is selected from the group consisting of nattokinase, bromelain, papain and combinations thereof. Preferably, the first group of enzymes includes 0.01 wt % of nattokinase per unit weight of the food, 0.01 wt % of bromelain per unit weight of the food, and 0.02 wt % of papain per unit weight of the food. The nattokinase has an activity of 20,000 FU/g, the bromelain has an activity of 200 CDU/g, and the papain has an activity of 10,000 FU/g. The first group of enzymes decomposes protein in the food in a first enzyme reaction. A mixture of the first group of enzymes and the food is cooled to a temperature below 45° C., and let the mixture of the first group of enzymes and the food rest for 120 minutes. Then, the mixture of the first group of enzymes and the food is boiled for 10 minutes to terminate the first enzyme reaction.

In the second decomposition step S2, the boiled mixture is cooled to a temperature below 45° C. A second enzyme is added into the mixture of the first group of enzymes and the food below 45° C. (3 wt % of second enzyme is added per unit weight of the food), and let mixture of the first group of enzymes, the food, and the second enzyme below 45° C. rest for 30 minutes. The second enzyme carries out a second-stage decomposition of protein in the food in a second enzyme reaction while resting the mixture of the first group of enzymes, the food, and the second enzyme. Then, the mixture of the first group of enzymes, the food, and the second enzyme is boiled for 10 minutes to terminate the second enzyme reaction. Preferably, the second enzyme is pepsin having an activity of 1,000 AU/g.

The first group of enzymes consisting of nattokinase, bromelain, and papain removes the protein from the food in the first decomposition step. In the second decomposition step, the second enzyme removes the protein remaining in the food after the first decomposition step. Thus, various proteins are removed to a large extent during production of nutritive foods. The resultant nutritive foods have better quality and a better preservation effect and taste better. No toxic substances are generated during removal of the proteins by non-chemical enzymes, such that the nutritive foods are natural and healthy and meet the concept of modern nutrition. It can be appreciated that the method according to the present invention can be used to process foods other than clams.

Although specific embodiments have been illustrated and described, numerous modifications and variations are still possible without departing from the scope of the invention. The scope of the invention is limited by the accompanying claims.

The invention claimed is:

1. A method for removing protein from a food, comprising:
a first decomposition step including: adding a first group of enzymes into a food while cooking the food, with the first group of enzymes decomposing protein in the food in a first enzyme reaction, wherein the first group of enzymes comprises nattokinase and at least one enzyme selected from the group consisting of bromelain or papain; cooling a mixture of the first group of enzymes and the food to a temperature below 45° C.; leaving the mixture of the first group of enzymes and the food undisturbed below 45° C. for a predetermined time; and cooking the mixture of the first group of enzymes and the food to terminate the first enzyme reaction;
a second decomposition step including: cooling the boiled mixture to a temperature below 45° C.; adding a second stage enzyme into the mixture of the first group of enzymes and the food below 45° C.; leaving a mixture of the first group of enzymes, the food, and the second stage enzyme undisturbed below 45° C. for a predetermined time, with the second stage enzyme carrying out a second-stage decomposition of protein in the food in a second stage enzyme reaction; and cooking the mixture of the first group of enzymes, the food, and the second stage enzyme to terminate the second stage enzyme reaction.

2. The method for removing protein from a food as claimed in claim 1, wherein the first group of enzymes includes 0.01 wt % of nattokinase per unit weight of the food, 0.01 wt % of bromelain per unit weight of the food, and 0.02 wt % of papain per unit weight of the food.

3. The method for removing protein from a food as claimed in claim 2, wherein the nattokinase has an activity of 20,000 FU/g, the bromelain has an activity of 200 CDU/g, and the papain has an activity of 10,000 FU/g.

4. The method for removing protein from a food as claimed in claim 1, wherein the mixture of the first group of enzymes and the food is left undisturbed for 120 minutes before boiling the mixture of the first group of enzymes and the food.

5. The method for removing protein from a food as claimed in claim 1, wherein 3 wt % of second stage enzyme is added per unit weight of the food.

6. The method for removing protein from a food as claimed in claim 1, wherein the mixture of the first group of enzymes, the food, and the second stage enzyme is left undisturbed for 30 minutes before boiling the mixture of the first group of enzymes, the food, and the second enzyme.

7. The method for removing protein from a food as claimed in claim 1, wherein the second stage enzyme is pepsin.

8. The method for removing protein from a food as claimed in claim 7, wherein the pepsin has an activity of 1,000 AU/g.

* * * * *